United States Patent [19]

Vatavuk et al.

[11] Patent Number: 5,614,022
[45] Date of Patent: Mar. 25, 1997

[54] THERMAL SPRAYING LINING PROCESS FOR PISTON RINGS AND NOZZLE FOR SPRAYING

[75] Inventors: Jan Vatavuk; Jose R. Z. Neto, both of Santo Andre; Marcos R. Piccili, Sao Paulo, all of Brazil

[73] Assignee: COFAP-Companhia Fabricadora de Pecas, San Andre, Brazil

[21] Appl. No.: 233,048

[22] Filed: Apr. 25, 1994

Related U.S. Application Data

[63] Continuation-in-part of Ser. No. 996,905, Dec. 28, 1992, abandoned.

[30] Foreign Application Priority Data

Jan. 3, 1992 [BR] Brazil ..................... 9200089

[51] Int. Cl.⁶ .................... B05C 5/04; B05B 7/18
[52] U.S. Cl. .................... 118/302; 118/320; 427/449; 427/455; 427/456; 239/80; 239/83
[58] Field of Search .................... 427/449, 455, 427/456; 239/79, 80, 83; 118/302, 320

[56] References Cited

U.S. PATENT DOCUMENTS

| | | | |
|---|---|---|---|
| 2,207,765 | 7/1940 | Stevens | 239/83 |
| 2,588,421 | 3/1952 | Shepard | 117/71 |
| 3,133,341 | 5/1964 | Marien | 29/156.63 |
| 3,332,752 | 7/1967 | Batchelor et al. | 427/449 |
| 3,690,686 | 9/1972 | Prasse et al. | 29/198 |
| 3,988,119 | 10/1976 | Takahashi et al. | 29/195 |
| 5,032,469 | 7/1991 | Merz et al. | 428/662 |

FOREIGN PATENT DOCUMENTS 61-8447  1/1986  Japan .

*Primary Examiner*—Katherine Bareford
*Attorney, Agent, or Firm*—Darby & Darby

[57] ABSTRACT

A method and apparatus for coating piston rings by producing droplets of molybdenum and stainless steel from these materials in wire form which are sprayed, preferably in equal amounts to coat the outer surfaces of the rings. A plurality of rings are mounted on a body which are moved in a helical path during the spraying. A nozzle is used having a central passage through which the wire is fed and two sets of passages, one set for an oxy-acetylene mixture and the other for compressed air, with the outlet orifices of the two sets of passages arranged in concentric rings around the central passage outlet orifice.

7 Claims, 3 Drawing Sheets

FIG. 1
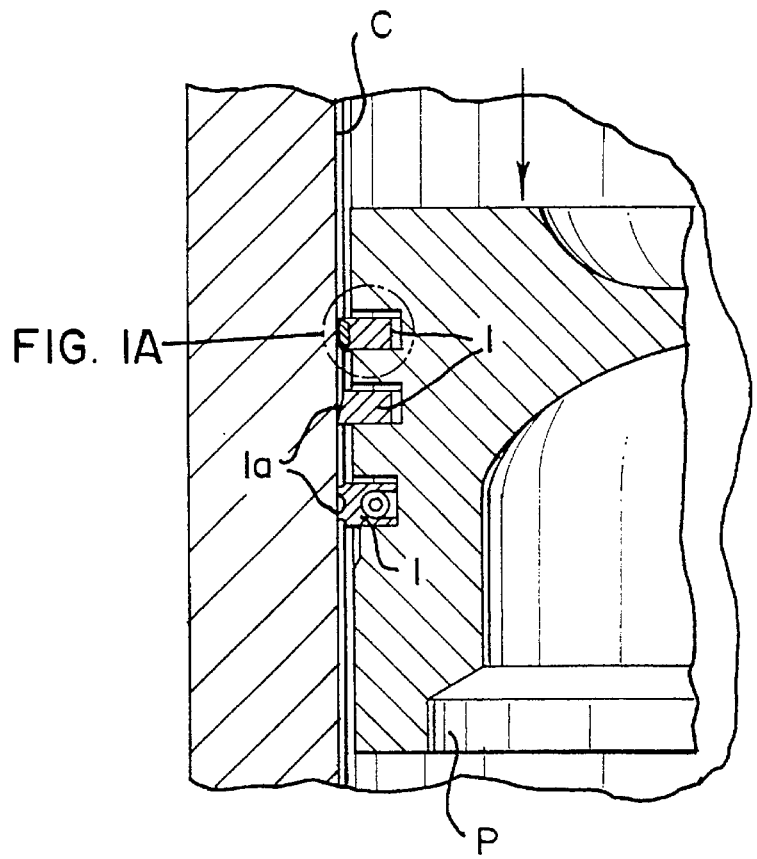
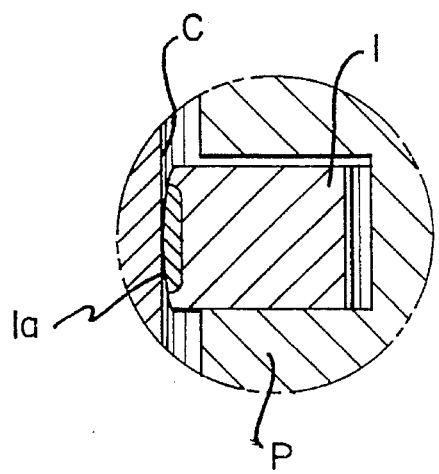
FIG. 1A

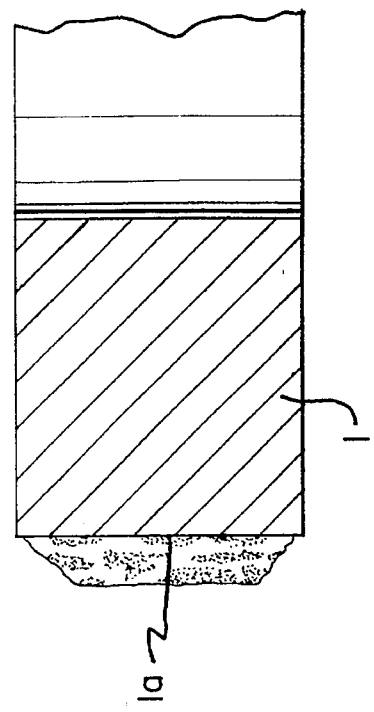
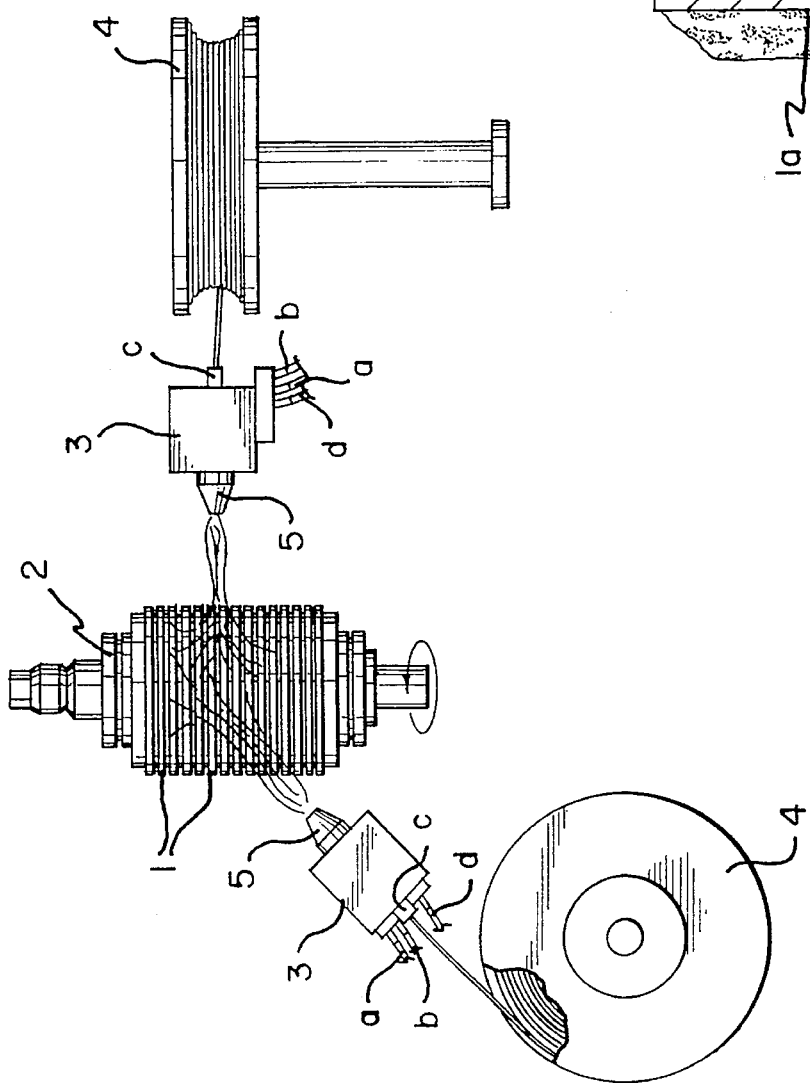

THERMAL SPRAYING LINING PROCESS FOR PISTON RINGS AND NOZZLE FOR SPRAYING

RELATED APPLICATION

This application is a continuation-in-part of application Ser. No. 07/996,905 filed Dec. 28, 1992, now abandoned, which is assigned to the same assignee.

TECHNICAL FIELD

The present invention relates to a thermal spraying lining process for piston rings, which uses different materials, presents an operational low cost and maintains stable average lining properties. It also relates to a nozzle for effecting the spraying.

BACKGROUND ART

A known thermal spraying lining process for piston rings employs 99.9% pure molybdenum feeding wires, which are melted by respective torches of oxygen and acetylene. In this process, droplets of melted molybdenum are sprayed against the external contact faces of piston rings, said faces presenting a relatively low temperature as compared to that of the droplets upon reaching said external contact face, compressed air being used as a propellant. The adhesion between the droplets and the external contact face of the piston rings is mechanically achieved, by the solidification of said droplets onto a somewhat roughened surface of the external contact face of the rings, due to the high contraction tension during solidification.

Besides the high cost of this process, which uses only molybdenum, the resultant lining layer proves to be fragile, due to the fact that the welding of successive lining layers occurs through oxide-rich interfaces. Such fragility makes the lining susceptible to cracks and chips, when the piston ring is submitted to mechanical stresses. The integrity of the lining with molybdenum is affected by the operational high temperatures of said piston ring close to the combustion chamber, mainly due to the substantial difference between the thermal expansion coefficients of the molybdenum and the basic metal of iron alloy, giving rise to said cracks when under stress.

Moreover, the spraying lining process using wires is not very versatile in relation to the combination of different materials.

Another known process employs powder spraying, which enables the association of materials, but has a very high cost, mainly in the case of plasma arc spraying.

OBJECTS OF THE INVENTION

Thus it is an object of the present invention to provide a thermal spraying lining process for piston rings, which produces a lining that is resistant to cracks and chips when submitted to high mechanical stresses, with the process being of low cost.

Another object of the present invention is to provide a thermal spraying lining process for piston rings, presenting more versatility in relation to the combination of different materials, thereby enabling the composition of different properties.

Still a further object is to provide a nozzle for effecting efficient thermal spraying of a material provided in wire form, particularly a material such as stainless steel, which is somewhat softer than another material used, such as molybdenum.

An additional object is to provide a thermal spraying process including a novel nozzle which permits the amounts of two different materials, such as molybdenum and stainless steel, to be accurately controlled.

BRIEF DESCRIPTION OF THE INVENTION

These objects are achieved through a thermal spraying lining process for piston rings, which comprises the initial step of anchoring a plurality of piston rings on a basic structure against mutual relative displacements, so that their external contact faces define a cylindrical surface, and a complementary step of spraying, progressively and continuously, by a forced gaseous stream, and onto the exposed cylindrical surface, a mass of droplets, which are melted and sprayed onto the surface by an oxy-acetylene torch-nozzle, from at least one molybdenum feeding wire, and from at least one feeding wire of a softer metallurgical bonding material, the mass of droplets consisting of about 30 to 60% of molybdenum, the remainder being bonding material, said spraying being made, so as to integrally line the cylindrical surface with the mass of droplets in at least one layer. In a preferred embodiment the bonding material is stainless steel in droplet form with a mass substantially equal to the molybdenum droplets, which is also melted into droplets and sprayed by a nozzle which can be operated to make the mass of the droplets of the bonding material substantially equal to that of the molybdenum droplets.

BRIEF DESCRIPTION OF THE DRAWINGS

The invention will be now described, according to the attached drawings, in which:

FIG. 1 shows a partial longitudinal section view of a piston operating inside a cylinder and provided with piston rings, the pressure of the gases being indicated by the arrow;

FIG. 1A is an enlarged detail of one of said piston rings, enhancing the lining of its external contact face;

FIG. 2 illustrates, schematically, the piston rings being sprayed by means of feeding wires, according to the present invention;

FIG. 3 shows an enlarged cross sectional view of part of a piston ring provided with lining on its external contact face.

DETAILED DESCRIPTION OF THE INVENTION

Figure 4A:
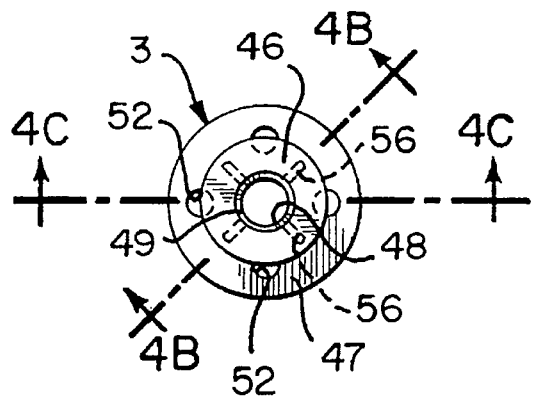
FIGS. 4A, 4B and 4C are respectively plan and cross-sectional views of a nozzle used for forming and spraying the droplets with FIGS. 4B and 4C respectively taken along lines 4B—4B and 4C—4C of FIG. 4A.

According to the present invention and referring to FIGS. 1–3, there are provided piston rings 1, to be mounted on a reciprocating piston P and which operate, during combustion, close to the internal wall of a cylinder C. Each piston ring 1 presents a somewhat roughened external contact face 1a, as shown in FIG. 3, which is to be provided with an anti-adhesive and anti-abrasion lining. The lining is to protect the piston rings 1 when they are submitted to high pressure and temperature during the combustion cycle. In one embodiment of the invention, the external contact face 1a of each piston ring 1 is initially produced by machining the piston ring 1, in order to make a superficial annular groove at the circular mid portion of said piston ring 1 the groove is to be later filled with the lining, as described below, until the diameter of the external contact face 1a of the piston ring 1 is built back up to the desired outer diameter dimension.

In another way of carrying out the invention, the lining layer is externally provided on the external contact face 1a, thus increasing the diameter of the part at the region where the lining is applied, until there is obtained a lining layer with an annular width sufficient to have, after final machining, a lining thickness from 2 to 7% of the basic annular width of the ring.

As illustrated in FIG. 2, a basic structure 2, such as a mandrel, carries and anchors, along its length, by using retaining means such as bolts and nuts or other suitable fasteners, a plurality of piston rings 1. The rings 1 are restrained from mutual relative displacements, and are arranged so as to define a cylindrical surface which has a rotational motion around a rotation shaft, which passes through the center of the ring set and which is coincident with the geometrical axis of the basic structure 2, and a translational motion, towards said geometrical axis. The rotational and translational motion is produced by any suitable mechanical arrangement.

At a certain distance from said basic structure 2, two gas nozzles 3 are provided, which are simultaneously fed through their respective inlets 1b, with oxygen and acetylene, so as to form a melting flame capable of melting the chemical elements used in the present spraying process. Each gas nozzle 3 is capable of flame regulation, which is achieved by varying the proportions of oxygen and acetylene in the flame.

Besides the gases which are fed to the nozzles 3, in order to form the flame described above, each nozzle 3 receives, through third and fourth inlets c and d, respectively, chemical elements to be melted and used in the lining of said piston rings 1. The nozzles also receive a volume of compressed air which carries, through an outlet "s" of each said nozzle 3, the droplets of each chemical element as melted by the flame towards the external contact face of the cylindrical surface of the basic structure 2 as formed by the outer surfaces of the rings 1.

In a preferred way of carrying out the invention, the lining is obtained through the simultaneous thermal spraying of two chemical elements, which are different but have the same concentration, and which are presented in the form of wires from feeding rolls 4, each wire respectively passing through a nozzle 3.

In the preferred embodiment, one of the chemical elements used in the lining is molybdenum, which is responsible for the anti-abrasive and anti-adhesive characteristics of the lining, and which is employed in a condition of 99.9% purity. The other of said materials is stainless steel. This element, which presents a lower hardness in relation to molybdenum, is responsible for the metallurgical bonding of molybdenum to the external contact face 1a of the piston rings 1, and for the cohesion of several lining layers applied over anterior layers. For each feeding wire that is used, the oxy-acetylene flame has a specific regulation, obtained through an adequate proportion of oxygen and acetylene defined according to the melting point of each element for the composition of the feeding wires.

The stainless steel, which has a lower melting point, makes possible a better metallurgical bonding, increasing the strength against cracks in the lining under mechanical stresses, improving the adhesion thereof to the basic metal of the piston ring 1, as well as the cohesion of the sprayed droplets.

The adhesion of the lining to the basic metal of the rings 1 is mainly metallurgical. In this adhesion, the molybdenum droplets, when sprayed onto the external contact face of the piston rings, reach this surface, which is at a lower temperature, thus being solidified in an anchored condition to the roughened surface 1a of the basic metal due to its solidification.

According to the present invention, the lining is obtained by employing an alloy, in this case being a chemical metallurgical alloy of molybdenum and stainless steel, in order to obtain a better adhesion of molybdenum to the external contact face 1a of the piston rings, thus guaranteeing its resistance against cracks and breakages during the high working temperatures to which the piston rings 1 are subjected close to the combustion chamber.

The spraying takes place without interruption during a determined number of cycles of motions of the basic structure 2, until the external contact face 1a of each piston ring 1 of said basic structure 2 presents a homogeneous and continuous lining layer of the molybdenum/stainless steel mixture with an annular thickness, as previously described.

In the present solution, the lining is obtained by providing the simultaneous spraying of molybdenum and stainless steel, taking into account the points that are longitudinally displaced throughout the extension of the basic structure 2, so as to define, on the cylindrical surface of said basic structure 2, helical paths caused by the rotational and translational motions of said basic structure 2 in relation to the gas nozzle 3 and, consequently, to the mass of droplets that are melted by spraying.

The stainless steel improves the adhesion of molybdenum to the basic metal of the external contact face 1a of each piston ring 1, and also allows the bonding of the molybdenum droplets to each other. Each feeding wire roll 4 has its own feeding speed for its respective nozzle 3, defined according to the concentration required for the mixture of each chemical element used in the lining. Details of a preferred form of nozzle are given below.

Moreover, the rotational speed of the basic structure 2 keeps a proportionality with the rotational speed of the feeding wire rolls 4 feeding the gas nozzles 3, which is defined according to the number of layers and annular width of each lining layer to be metallurgically adhered to the external contact face 1a of each piston ring 1. The modulus of said rotational speed of the basic structure 2, in relation to the modulus of the rotational speed of each feeding wire roll 4 can be, for example, null.

After finishing the spraying of the molybdenum stainless steel alloy onto the cylindrical surface, each piston ring 1 is submitted to machining at its external contact face 1a, in order to finish its working profile.

Figure 4B:
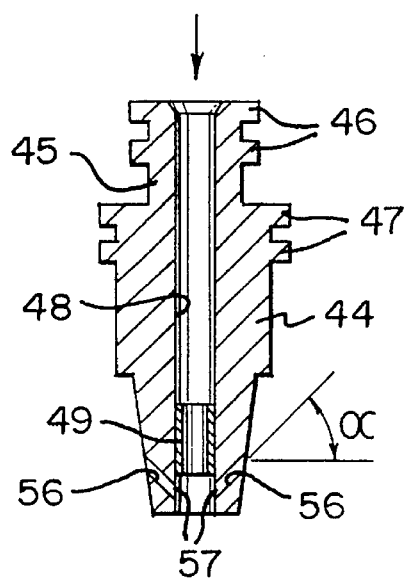
Figure 4C:
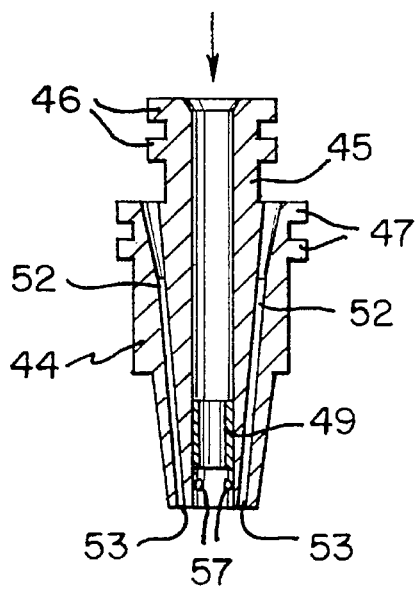

FIGS. 4A–4C show the details of a nozzle 3 which can be used to produce the flame to form one of the molybdenum or stainless steel wires into the droplets to produce an effective spraying pattern. The nozzle is described for use with the stainless steel wire but can be adapted for molybdenum wire.

Referring to FIGS. 4A–4C, the nozzle 3 has an elongated body 44 with a reduced diameter end 45. A through axial passage 48 extends the length of the nozzle body and the stainless steel wire from the roll supply 44 is fed through the passage 48 and exit from the nozzle at the outlet 49 of passage 48. The feeding direction is from the top as shown in FIGS. 4B and 4C. Threads or ridges 46 are provided at the nozzle reduced diameter section 45 and below at 47 on the main body section 44 to connect the nozzle 40 to the supply means (not shown) for the air, oxygen and acetylene gas supply and the wire.

As seen in FIG. 4C, the nozzle has a plurality of passages 52 arranged in a circular ring for the flow of the oxy-acetylene gas, the discharge orifices 53 of which are shown in FIG. 4A. The inlet to passages 52 is at the transition between the reduced diameter section 45 and the main body 44. Four such passages 52 are shown, with a spacing of approximately 90° between each. As seen in FIG. 4C, the passages 52 are angled inwardly toward the outlet 49 of the central passage 48. Of course, it should be understood that three or more passages can be used, if desired, but four are preferred.

There are also a plurality of compressed air supply passages 56 whose outlets 57 are arranged concentrically around and discharge air into the nozzle central passage 48 at outlet 49 and which are internal of the ring of oxy-acetylene gas passages 52. As seen in FIG. 4B, the air passages 56 are angled toward the center of the nozzle and have discharge orifices 57, as shown in FIG. 4B, which are oriented around and discharge towards the outlet of the central passage 48. The outlet orifices 57 of the air passage 56 are in a ring and inward of the ring of oxy-acetylene discharge orifices 53. As shown in FIG. 4A, there are four air passages 56 whose outlets 57 are spaced apart by approximately 90° which are offset by about 45° relative to the outlet orifices 57 of the fuel gas passages 52. The number of air passages is preferably made equal to the number of fuel-gas passages. That is, as seen in FIG. 4A, there is alternately a fuel gas passage outlet of the outer ring and an air passage outlet of the inner ring. The discharge of the compressed air from an orifice 57 between two of the fuel gas orifices 53 provides for efficient mixing of the air and fuel and the spray of the droplets of metal which are produced.

In operation, the pressure for the acetylene component of the fuel for nozzles for both molybdenum and the stainless steel is equal. It is preferred that the flow ratio for a nozzle using the stainless steel wire is between 70% and 80% of the flow for a nozzle used to form and spray molybdenum droplets, the latter varying between 990 and 1190 meters$^3$/hour. Thus, acetylene flow for a nozzle for stainless steel is from 693 to 952 meters$^3$/hour.

In the operation of the nozzle for the molybdenum, oxygen is preferably applied on the basis of about 3.0 to 3.5 times the pressure of the acetylene. It is preferred that the flow ratio of the oxygen be between 90 and 105% of that of the acetylene.

For stainless steel, the pressure is preferably 1.4 to 1.8 times that of oxygen for the molybdenum nozzle at a flow rate between 60 and 73% of that of the oxygen for the molybdenum nozzle.

The pressure of the compressed air for both types of nozzles are preferably substantially equal. The flow ratio of compressed air for stainless steel should be about 90% to 100% of that for molybdenum, with the latter being in the range of from 70 to 80 meters$^3$/hr.

The distance between the nozzles and the surfaces to be coated is preferably such that the nozzle spraying stainless steel is between 70 and 80% of that of the nozzle spraying molybdenum.

The stainless steel and molybdenum wires are fed at the same rate and volume of material.

The relationship between the exit area of the four fuel gas (oxygen and acetylene) mixture orifices 53 and the four cooling and compressed air spray orifices 57 is preferably between 0.95 and 1.45.

Utilizing the described dimensions and parameters the compressed air orifices 57 permit melting of the stainless steel wire, a condition similar to that for molybdenum since an air channel is formed between the flame and the wire. This delays melting and considerably reduces the flame temperatures, thus permitting spraying of stainless steel droplets at the same rate as that of molybdenum droplets.

Using the above parameters, a nozzle produces droplets and sprays stainless steel (fusion temperature of 1480° C.) at substantially the same rate and volume as molybdenum (fusion temperature at 2600° C.). Of course, the materials for the nozzles themselves are such as to be able to withstand the temperatures produced.

In the prior art, a process for coating an article with the same mass or volume proportions was only possible via a spray of a metallic powder mixture or of previously prepared alloys in powder form in equipment suitable for spraying materials in powder form.

Plasma powder spray is normally carried out in an inert atmosphere, which does not allow oxidation of the molybdenum to occur. Furthermore, a powder spray process is much more expensive than the process of the subject invention using simple wires of molybdenum and stainless steel. The process of the present invention also allows that a certain oxidation of the molybdenum occur, thus increasing resistance to wear and the anti-friction properties of the coating.

We claim:

1. A nozzle for forming droplets of molten metal from the metal in wire form and spraying the droplets of molten metal comprising:

a nozzle body having an outlet end and a central passage through said body having an outlet orifice at said outlet end through which the wire is fed, a first set of passages in said nozzle body through which compressed air is fed and a second set of passages in said nozzle body through which an oxygen-acetylene fuel is fed, each passage having an outlet orifice at the nozzle body outlet end, the outlet orifices of said first and second sets of passages each arranged in a respective pattern around the central passage outlet orifice, the outlet orifices of the first set of passages for feeding compressed air being closer to the central passage outlet orifice than the outlet orifices of the second set of passages, and the outlet orifices of said first set of passages directing compressed air toward said outlet orifice of said central passage and the wire passing therethrough.

2. A nozzle as in claim 1 wherein the outlet orifices of the first and second sets of passages alternate.

3. A nozzle as in claim 1 wherein the outlet orifices of said first set of passages are in said central passage outlet orifice to discharge the compressed air into said central passage outlet orifice and directly onto the wire in the central passage outlet orifice.

4. A system for flame spraying an article with molten droplets formed from each of a wire of stainless steel and a molybdenum wire comprising:

a supply of each of stainless steel wire and molybdenum wire, a separate nozzle for each of said wires, means for supplying compressed air and oxy-acetylene fuel to each of said nozzles in an amount and at a pressure to produce and spray the article being coated with substantially equal volumes of molten stainless Steel and molten molybdenum droplets, each said nozzle comprising a nozzle body having an outlet end and a central passage through said body having an outlet orifice at said outlet end through which the wire is fed, a first set of passages in said body through which compressed air is fed and a second set of passages in said body through which an oxygen-acetylene fuel is fed, each passage having an outlet orifice at the nozzle body outlet end, the outlet orifices of said first and second sets of passages each arranged in a respective pattern around the central passage outlet orifice, the outlet orifices of the first set of passages for feeding compressed air being closer to the central passage outlet orifice than the outlet orifices of the second set of passages, and the outlet orifices of said first set of passages directing compressed air toward said outlet orifice of said central passage and the wire therethrough.

5. A nozzle as in claim 4 wherein the outlet orifices of the first and second sets of passages alternate.

6. A nozzle as in claim 4 wherein the outlet orifices of said first set of passages are in said central passage outlet orifice to discharge the compressed air into said central passage outlet orifice and directly onto the wire in the central passage outlet orifice.

7. A system for flame spraying piston rings with molten droplets formed from each of a wire of stainless steel and a wire of molybdenum comprising:

a supply of each of stainless steel wire and molybdenum wire, a separate nozzle for each of said wires, means for supplying compressed air and oxy-acetylene fuel to each of said nozzles in an amount and at a pressure to produce and spray the article being coated with substantially equal volumes of molten stainless steel and molten molybdenum droplets, each said nozzle comprising a nozzle body having an outlet end and a central passage through said body having an outlet orifice at said outlet end through which the wire is fed, a first set of passages in said body through which compressed air is fed and a second set of passages in said body through which an oxygen-acetylene fuel is fed, each passage having an outlet orifice at the nozzle body outlet end, the outlet orifices of said first and second sets of passages each arranged in a respective pattern around the central passage outlet orifice, the outlet orifices of the first set of passages for feeding compressed air being closer to the central passage outlet orifice than the outlet orifices of the second set of passages, and the outlet orifices of said first set of passages directing compressed air toward said outlet orifice of said central passage and the wire passing therethrough, and further comprising:

a carrier on which at least one such piston ring is mounted, each said nozzle having its outlet end mounted to spray molten droplets of the metal toward the outer surface of said carrier, means for rotating and moving said carrier in a translational path to produce a generally helical motion while the article is being sprayed.

* * * * *